US012725735B2

(12) United States Patent
Takeuchi et al.

(10) Patent No.: US 12,725,735 B2
(45) Date of Patent: Sep. 1, 2026

(54) CAPACITOR, ELECTRIC CIRCUIT, CIRCUIT BOARD, APPARATUS, AND POWER STORAGE DEVICE

(71) Applicant: Panasonic Intellectual Property Management Co., Ltd., Osaka (JP)

(72) Inventors: Hiroki Takeuchi, Osaka (JP); Ryosuke Kikuchi, Osaka (JP); Kei Amii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 146 days.

(21) Appl. No.: 18/947,869

(22) Filed: Nov. 14, 2024

(65) Prior Publication Data

US 2025/0069808 A1 Feb. 27, 2025

Related U.S. Application Data

(63) Continuation of application No. PCT/JP2023/012325, filed on Mar. 27, 2023.

(30) Foreign Application Priority Data

May 18, 2022 (JP) ................................ 2022-081901

(51) Int. Cl.
*H01G 4/10* (2006.01)
*H01G 4/33* (2006.01)

(52) U.S. Cl.
CPC ................ *H01G 4/10* (2013.01); *H01G 4/33* (2013.01)

(58) Field of Classification Search
CPC .................................. H01G 4/10; H01G 4/33
See application file for complete search history.

(56) References Cited

U.S. PATENT DOCUMENTS

| | | | | |
|---|---|---|---|---|
| 2006/0035450 | A1 | 2/2006 | Frank et al. | |
| 2019/0131426 | A1* | 5/2019 | Lu | H10D 1/66 |
| 2022/0178012 | A1 | 6/2022 | Funakubo et al. | |

FOREIGN PATENT DOCUMENTS

| | | | |
|---|---|---|---|
| JP | 2006-054465 | A | 2/2006 |
| JP | 2015-506089 | A | 2/2015 |
| JP | 2021-528856 | A | 10/2021 |
| WO | 2013/075209 | A1 | 5/2013 |
| WO | 2019/208340 | A1 | 10/2019 |
| WO | 2019/245751 | A1 | 12/2019 |
| WO | 2020/218617 | A1 | 10/2020 |

OTHER PUBLICATIONS

International Search Report dated Jun. 20, 2023 issued in International Patent Application No. PCT/JP2023/012325, with English translation.

(Continued)

*Primary Examiner* — David M Sinclair
(74) *Attorney, Agent, or Firm* — Rimon P.C.

(57) ABSTRACT

A capacitor includes a first electrode, a second electrode, and a dielectric. The dielectric is disposed between the first electrode and the second electrode. The dielectric includes an oxide having a composition represented by $Hf_{1-x-y}Si_xGa_yO_z$. This composition satisfies requirements $0.01 \leq x$, $0.05 \leq y \leq 0.11$, and $0.09 \leq x+y \leq 0.15$.

7 Claims, 10 Drawing Sheets

(56) References Cited

OTHER PUBLICATIONS

Min Hyuk Park et al., “Ferroelectricity and Antiferroelectricity of Doped Thin HfO2-Based Films”, Advanced Materials, vol. 27, pp. 1811-1831, 2015.
S. Starschich et al., “An extensive study of the influence of dopants on the ferroelectric properties of HfO2”, Journal of Materials Chemistry C, vol. 5, pp. 333-338, 2017.
Hyo Jeong Kim et al., “Low-Thermal-Budget Fluorite-Structure Ferroelectrics for Future Electronic Device Applications”, Physica Status Solidi RRL, vol. 15, 2100028, pp. 1-9, 2021.
T. Shiraishi et al., “Formation of the orthorhombic phase in CeO2—HfO2 solid solution epitaxial thin films and their ferroelectric properties”, Applied Physics Letters, vol. 114, 232902, pp. 1-5, 2019.

* cited by examiner

CAPACITOR, ELECTRIC CIRCUIT, CIRCUIT BOARD, APPARATUS, AND POWER STORAGE DEVICE

This application is a continuation of PCT/JP2023/012325 filed on Mar. 27, 2023, which claims foreign priority of Japanese Patent Application No. 2022-081901 filed on May 18, 2022, the entire contents of which are incorporated herein by reference.

BACKGROUND OF THE INVENTION

1. Field of the Invention

The present disclosure relates to a capacitor, an electric circuit, a circuit board, an apparatus, and a power storage device.

2. Description of Related Art

It has been known to add a dopant to $HfO_2$ so as to change dielectric properties.

For example, Advanced Materials, 2015, 27, 1811-1831 by M. H. Park et al, describes that a $HfO_2$ film doped with Si, Al, Zr or the like exhibits antiferroelectricity.

WO 2019/208340 describes a capacitor including a first electrode layer, a dielectric layer, and a second electrode layer. The dielectric layer is formed on the first electrode layer. The second electrode layer is formed on the dielectric layer. The dielectric layer includes a metal oxide, and the metal oxide includes $HfO_2$ where a part of Hf is substituted by Bi and an element with a valence of 5 or more. The dielectric layer has antiferroelectricity. Therefore, the dielectric layer exhibits high permittivity when applied with a bias electric field.

Journal of Materials Chemistry C, 2017, 5, 333 by S. Starschich et al, describes influences of dopants such as Mg, Ba, Sr, Y, La, Nd, Sm, Er, Al, Ga, In, Co, and Ni on the ferroelectricity of $HfO_2$. $HfO_2$ doped with Ga has ferroelectricity.

Phys. Status Solidi RRL 2021, 15, 2100028 by Hyo Jeong Kim et al, describes that a $Hf_{1-x}B_xO_2$ film exhibits ferroelectricity (here B=Zr, Si, Al, Gd, La, Y or the like).

Applied Physics Letters, 2019, 114, 232902 by T. Shiraishi et al, describes that a 0.1 $CeO_2$–0.9 $HfO_2$ thin film exhibits ferroelectricity.

SUMMARY OF THE INVENTION

The techniques described in Advanced Materials, 2015, 27, 1811-1831 by M. H. Park et al, and WO 2019/208340 may need to be reconsidered from the viewpoint of high capacitance and highly efficient charging and discharging. Therefore, the present disclosure provides a capacitor advantageous from the viewpoint of high capacitance and highly efficient charging and discharging while using a Hf-containing oxide as a dielectric.

The capacitor of the present disclosure includes:

a first electrode;

a second electrode; and a dielectric disposed between the first electrode and the second electrode, wherein the dielectric includes an oxide having a composition represented by $Hf_{1-x-y}Si_xGa_yO_z$, and in the composition, z is a value to maintain electroneutrality of the oxide, and the composition satisfies requirements $0.01 \leq x$, $0.05 \leq y \leq 0.11$, and $0.09 \leq x+y \leq 0.15$.

According to the present disclosure, a capacitor advantageous from the viewpoint of high capacitance and highly efficient charging and discharging while using a Hf-containing oxide as a dielectric, can be provided.

DETAILED DESCRIPTION

Findings Underlying the Present Disclosure

Figure 1:
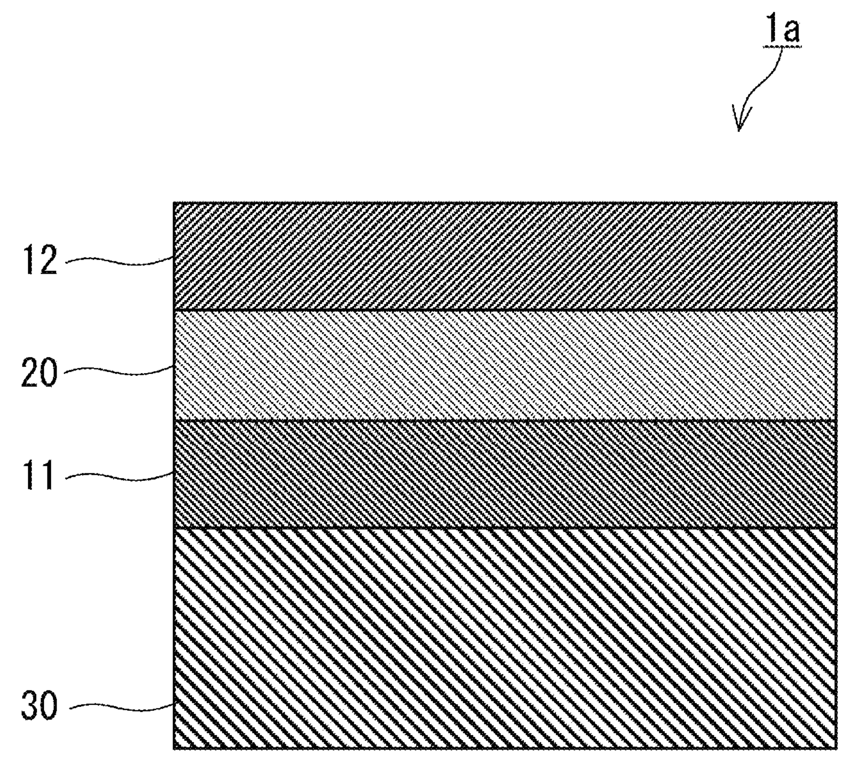
FIG. 1 is a cross-sectional view showing an example of a capacitor of the present disclosure.

For example, in an antiferroelectric dielectric, within a given range of an electric field strength, an amount of change in polarization of the dielectric relative to an amount of change in an electric field strength increases accompanying an increase in the electric field strength. Such a nonlinear relation between the amount of change in polarization of the dielectric relative to the amount of change in the electric field strength is advantageous from the viewpoint of allowing high capacitance charging and discharging in a capacitor including the dielectric. In the meantime, due to this nonlinear relation, hysteresis loss may occur in a capacitor including a dielectric obtained by adding a dopant to $HfO_2$. Due to the hysteresis loss, the amount of charge output by discharging is less than the amount of charge stored by increasing the voltage for charging. Occurrence of the hysteresis loss causes an energy loss problem, namely, the energy that can be output from the capacitor in discharging is low for the energy stored by charging the capacitor.

This cannot be advantageous from the viewpoint of efficient charging and discharging of the capacitor.

According to the above literatures, it is understood that addition of elements such as Si, Al, Y, La, and Ce to $HfO_2$ causes distinct ferroelectricity or antiferroelectricity. On the other hand, according to a report referring to a case of adding Ga to $HfO_2$, only a slight ferroelectricity is confirmed. There have been no reports of adding Ga to $HfO_2$ together with Si, since the addition of Ga causes only slight ferroelectricity.

In view of these circumstances, the inventors have been earnestly investigating possibility of providing a capacitor with high capacitance and capable of highly efficient charging and discharge while using Hf-containing oxides as dielectrics. The inventors found thereby that, by using a dielectric including an oxide with a specified composition that includes Hf, it is possible to achieve a nonlinear relation between the amount of change in polarization of the dielectric relative to the amount of change in an electric field strength, and also suppress hysteresis loss, in a capacitor. Based on this new finding, the present inventors have suggested the present disclosure of a capacitor.

Outline of One Aspect According to the Present Disclosure

A capacitor according to a first aspect of the present disclosure includes:

- a first electrode;
- a second electrode; and
- a dielectric disposed between the first electrode and the second electrode, wherein
- the dielectric includes an oxide having a composition represented by $Hf_{1-x-y}Si_xGa_yO_z$, and
- in the composition, z is a value to maintain electroneutrality of the oxide, and
- the composition satisfies requirements $0.01 \leq x$, $0.05 \leq y \leq 0.11$, and $0.09 \leq x+y \leq 0.15$.

According to the first aspect, the relation between the amount of change in polarization of the dielectric relative to the amount of change in electric field strength is likely to be a nonlinear relation. In addition, hysteresis loss is easily suppressed in charging and discharging of the capacitor. Therefore, the capacitor according to the first aspect is advantageous from the viewpoint of high capacitance and highly efficient charging and discharging.

In a second aspect of the present disclosure, for example, in the capacitor according to the first aspect, the oxide may include a fluorite structure. According to the second aspect, the relation between the amount of change in polarization of the dielectric relative to the amount of change in an electric field strength is more likely to be a nonlinear relation.

In a third aspect of the present disclosure, for example, in the capacitor according to the second aspect, the oxide may include at least one selected from the group consisting of a tetragonal phase and an orthorhombic phase. According to the third aspect, the relation between the amount of change in polarization of the dielectric relative to the amount of change in an electric field strength is more likely to be a nonlinear relation.

An electric circuit according to a fourth aspect of the present disclosure includes the capacitor according to any one of the first aspect to the third aspect. According to the fourth aspect, an electric circuit advantageous from the viewpoint of high capacitance and highly efficient charging and discharging can be provided.

A circuit board according to a fifth aspect of the present disclosure includes the capacitor according to any one of the first aspect to the third aspect. According to the fifth aspect, a circuit board advantageous from the viewpoint of high capacitance and highly efficient charging and discharging can be provided.

An apparatus according to a sixth aspect of the present disclosure includes the capacitor according to any one of the first aspect to the third aspect. According to the sixth aspect, an apparatus advantageous from the viewpoint of high capacitance and highly efficient charging and discharging can be provided.

A power storage device according to a seventh aspect of the present disclosure includes the capacitor according to any one of the first aspect to the third aspect. According to the seventh aspect, a power storage device advantageous from the viewpoint of high capacitance and highly efficient charging and discharging can be provided.

Embodiments

Embodiments of the present disclosure will be described below with reference to the attached drawings.

FIG. 1 is a cross-sectional view showing an example of a capacitor of the present disclosure. As shown in FIG. 1, a capacitor 1*a* includes a first electrode 11, a second electrode 12, and a dielectric 20. The dielectric 20 is disposed between the first electrode 11 and the second electrode 12. The dielectric 20 includes an oxide having a composition represented by $Hf_{1-x-y}Si_xGa_yO_z$. In the composition, the z is a value to maintain electroneutrality of the oxide. In addition, the composition satisfies requirements $0.01 \leq x$, $0.05 \leq y \leq 0.11$, and $0.09 \leq x+y \leq 0.15$. As a result, in the capacitor 1*a*, the relation between the amount of change in polarization of the dielectric and the amount of change in an electric field strength is likely to be a nonlinear relation, and hysteresis loss is easily suppressed in the charging and discharging of the capacitor 1*a*. Therefore, the capacitor 1*a* is advantageous from the viewpoint of high capacitance and highly efficient charging and discharging.

The z in the above composition is not limited to a specific value as long as the electroneutrality of the oxide is maintained. The z can vary, for example, depending on the value of the y and the process for producing the dielectric 20. The z satisfies, for example, a requirement $1.9 \leq z < 2$.

The structure of the oxide of the dielectric 20 is not limited to a particular structure. The oxide includes, for example, a fluorite structure. In this case, in the capacitor 1*a*, the relation between the amount of change in polarization of the dielectric relative to the amount of change in an electric field strength is more likely to be a nonlinear relation. The entire oxide may have a fluorite structure, or a part of the oxide may have a fluorite structure.

In the case where the oxide of the dielectric 20 includes a fluorite structure, the oxide may include at least one selected from the group consisting of a tetragonal phase and an orthorhombic phase. In this case, in the capacitor 1*a*, the relation between the amount of change in polarization of the dielectric relative to the amount of change in the electric field strength is more likely to be a nonlinear relation. The entire oxide may have at least one selected from the group consisting of the tetragonal phase and the orthorhombic phase, or a part of the oxide may have at least one selected from the group consisting of the tetragonal phase and the orthorhombic phase.

In the capacitor 1*a*, the shapes of the first electrode 11, the second electrode 12, and the dielectric 20 are not limited to any particular shapes. As shown in FIG. 1, the first electrode

11, the second electrode 12, and the dielectric 20 are each formed, for example, as a layer.

The thickness of the first electrode 11 is not limited to a specific value. The thickness of the first electrode 11 is, for example, 50 nm or more. In this case, the capacitor 1*a* is likely to have a low internal resistance. The thickness of the first electrode 11 is, for example, 500 nm or less. In this case, the entire capacitance density is likely to be high when a plurality of capacitors 1*a* are integrated to be used.

The material of the first electrode 11 is not limited to a specific material. The first electrode 11 may include a metal such as Pt, Au, Al, Ta, or Zr, for example. The first electrode 11 may include a conductive nitride such as TiN or TaN. The first electrode 11 may include a conductive oxide such as indium tin oxide (ITO), antimony tin oxide (ATO), or ZnO. In the case where the first electrode 11 is formed in an oxidizing atmosphere, the first electrode 11 preferably includes at least one selected from the group consisting of Pt, Au, ITO, and ZnO. In the case where the first electrode 11 is formed in a reducing atmosphere, the first electrode 11 preferably includes at least one selected from the group consisting of Pt, Au, Al, Ta, Zr, TiN, and TaN.

The thickness of the second electrode 12 is not limited to a particular value. The thickness of the second electrode 12 is, for example, 50 nm or more. In this case, the capacitor 1*a* is likely to have a low internal resistance. The thickness of the second electrode 12 is, for example, 500 nm or less. In this case, the entire capacitance density is likely to be high when a plurality of capacitors 1*a* are integrated to be used.

The material of the second electrode 12 is not limited to a specific material. The second electrode 12 may include, for example, a metal such as Pt, Au, Al, Ta, or Zr. The second electrode 12 may include doped polycrystalline silicon. The second electrode 12 may include an electrically conductive nitride such as TiN or TaN. The second electrode 12 may include an electrically conductive oxide such as ITO, ATO, or ZnO. The second electrode 12 may include an electrically conductive organic polymer such as polyaniline or polypyrrole. In the case where the second electrode 12 is exposed to an oxidizing atmosphere, the second electrode 12 preferably includes at least one selected from the group consisting of Pt, Au, ITO, ATO, and ZnO. In the case where the second electrode 12 is exposed to a reducing atmosphere, the second electrode 12 preferably includes at least one selected from the group consisting of Pt, Au, Al, Ta, Zr, TiN, TaN, and doped polycrystalline silicon. For example, in the case where an annealing process is performed after forming the second electrode 12 thereby to promote crystallization in the dielectric 20, the second electrode 12 may be exposed to an oxidizing atmosphere or a reducing atmosphere by a gas supplied around the second electrode 12. In the case where the second electrode 12 is exposed to an oxidizing atmosphere in the annealing process, the second electrode 12 more preferably includes at least one selected from the group consisting of Pt, ITO, ATO, and ZnO. In the case where the second electrode 12 is exposed to a reducing atmosphere in the annealing process, the second electrode 12 more preferably includes at least one selected from the group consisting of Pt, TiN, and TaN.

As shown in FIG. 1, the capacitor 1*a* further includes, for example, a support 30. The first electrode 11 is disposed, for example, on the support 30. Thereby, a laminate including the first electrode 11, the dielectric 20, and the second electrode 12 is supported by the support 30, and mechanical strength of the capacitor 1*a* is likely to be high. The support 30 can be used, for example, as a base for forming the first electrode 11. In the capacitor 1*a*, the support 30 may be omitted.

The support 30 is not limited to a particular support. The support 30 may be an electrical conductor, a semiconductor, or an insulator. In the case where the support 30 is an electrical conductor, the support 30 and the first electrode 11 may be formed integrally.

The thickness of the support 30 is not limited to a particular value. The thickness of the support 30 may be 50 nm or more and 500 nm or less, or may be more than 500 nm.

Figure 2A:
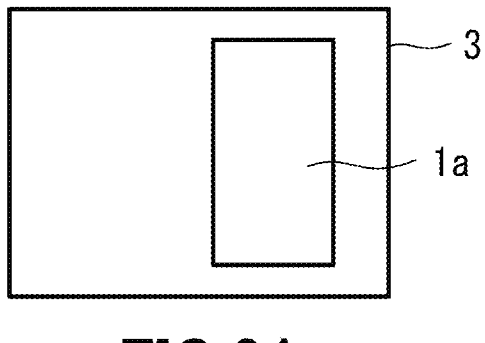
FIG. 2A schematically shows an example of an electric circuit of the present disclosure.

As shown in FIG. 2A, for example, an electric circuit 3 including a capacitor 1*a* can be provided. The electric circuit 3 is not limited to any particular circuit as long as it includes the capacitor 1*a*. The electric circuit 3 may be an active circuit or a passive circuit. The electric circuit 3 may be a discharging circuit, a smoothing circuit, a decoupling circuit, or a coupling circuit. The electric circuit 3 is advantageous from the viewpoint of high capacitance and highly efficient charging and discharging because the electric circuit 3 includes the capacitor 1*a*.

Figure 2B:
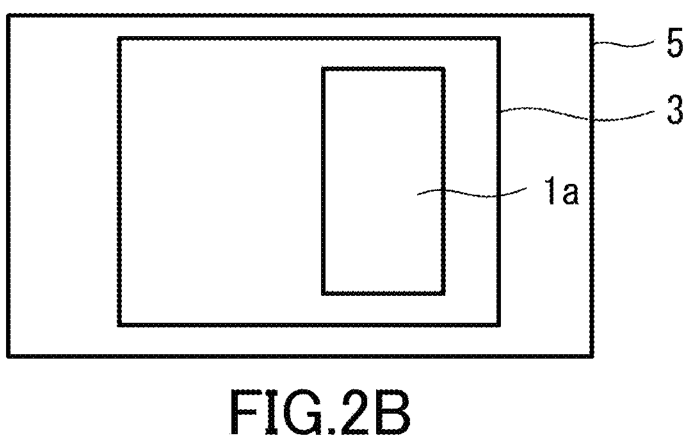
FIG. 2B schematically shows an example of a circuit board of the present disclosure.

As shown in FIG. 2B, for example, a circuit board 5 including a capacitor 1*a* can be provided. The circuit board 5 is advantageous from the viewpoint of high capacitance and highly efficient charging and discharging because the circuit board 5 includes the capacitor 1*a*. For example, the circuit board 5 includes an electric circuit 3 that includes the capacitor 1*a*.

Figure 2C:
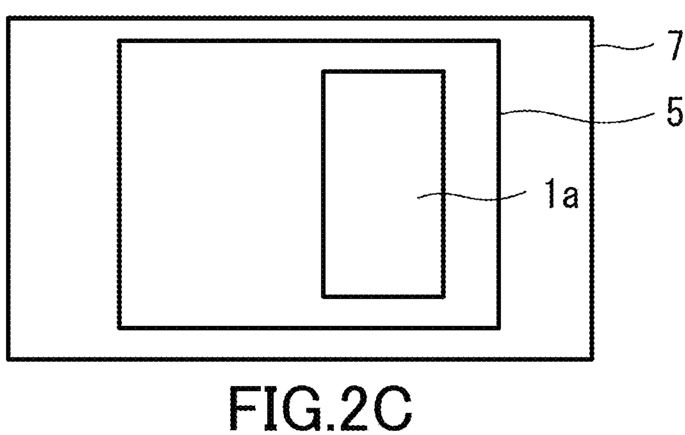
FIG. 2C schematically shows an example of an apparatus of the present disclosure.

As shown in FIG. 2C, for example, an apparatus 7 including a capacitor 1*a* can be provided. The apparatus 7 is advantageous from the viewpoint of high capacitance and highly efficient charging and discharging because it includes the capacitor 1*a*. The apparatus 7 includes, for example, a circuit board 5 including the capacitor 1*a*. The apparatus 7 may be an electronic apparatus, a communication apparatus, a signal processor, or a power supply unit. The apparatus 7 may be a server, an AC adapter, an accelerator, or a flat panel display such as a liquid crystal display (LCD). The apparatus 7 may be: a USB charger; a solid state drive (SSD); an information terminal such as PC, smartphone, or tablet PC; or an Ethernet switch.

Figure 2D:
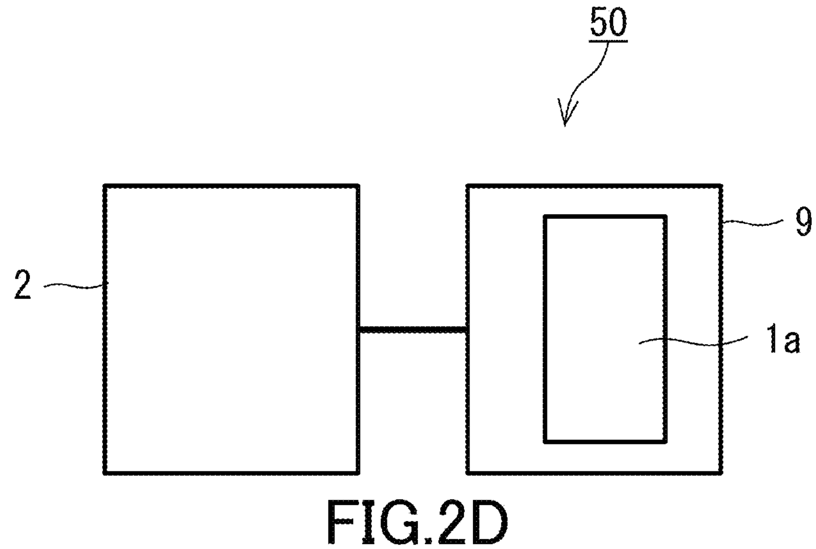
FIG. 2D schematically shows an example of a power storage device of the present disclosure.

As shown in FIG. 2D, for example, a power storage device 9 including a capacitor 1*a* can be provided. The power storage device 9 is advantageous from the viewpoint of high capacitance and highly efficient charging and discharging because it includes the capacitor 1*a*. As shown in FIG. 2D, for example, a power storage system 50 can be provided by use of the power storage device 9. The power storage system 50 includes the power storage device 9 and a power generating unit 2. In the power storage system 50, electricity generated due to power generation at the power generating unit 2 is stored in the power storage device 9. The power generating unit 2 is, for example, a device for photovoltaic power generation or wind power generation. The power storage device 9 is, for example, a device including a secondary battery such as a lithium ion battery or a lead-acid storage battery.

An example of a method for manufacturing the capacitor 1*a* will be described. First, a first electrode 11 is formed on a main surface of the support 30. For example, a vacuum process, plating, or coating may be employed to form the first electrode 11. Examples of the vacuum process include DC sputtering, RF magnetron sputtering, pulsed laser deposition (PLD), atomic layer deposition (ALD), and chemical vapor deposition (CVD). A metal foil such as an aluminum foil or a zirconium foil may be used as the support 30, and the support 30 and the first electrode 11 may be integrally configured. For example, a Pt (111) film may be epitaxially grown by RF magnetron sputtering on a c-plane sapphire single crystal substrate as the support 30.

Next, a film including an oxide having a composition represented by $Hf_{1-x-y}Si_xGa_yO_z$ is formed on the first electrode 11 so as to serve as the dielectric 20 or a precursor of the dielectric 20. The dielectric 20 or the precursor of the dielectric 20 can be formed using a vacuum process in the same manner as the formation of the first electrode 11. Alternatively, the dielectric 20 or the precursor of the dielectric 20 may be formed by a wet process such as dip coating, spin coating, or die coating, using a Chemical Solution Deposition (CSD) method.

For example, in the case where a film for the dielectric 20 is formed by RF magnetron sputtering, the film can be amorphous. Since the dielectric constant of the film is low if the film remains amorphous, for example, Rapid Thermal Anneal (RTA) processing is performed on this film to promote crystallization.

Next, the second electrode 12 is formed on the dielectric 20. Similarly to the first electrode 11, a vacuum process, plating, or coating may be applied to form the second electrode 12. The capacitor 1*a* can be manufactured in this manner.

Figure 3:
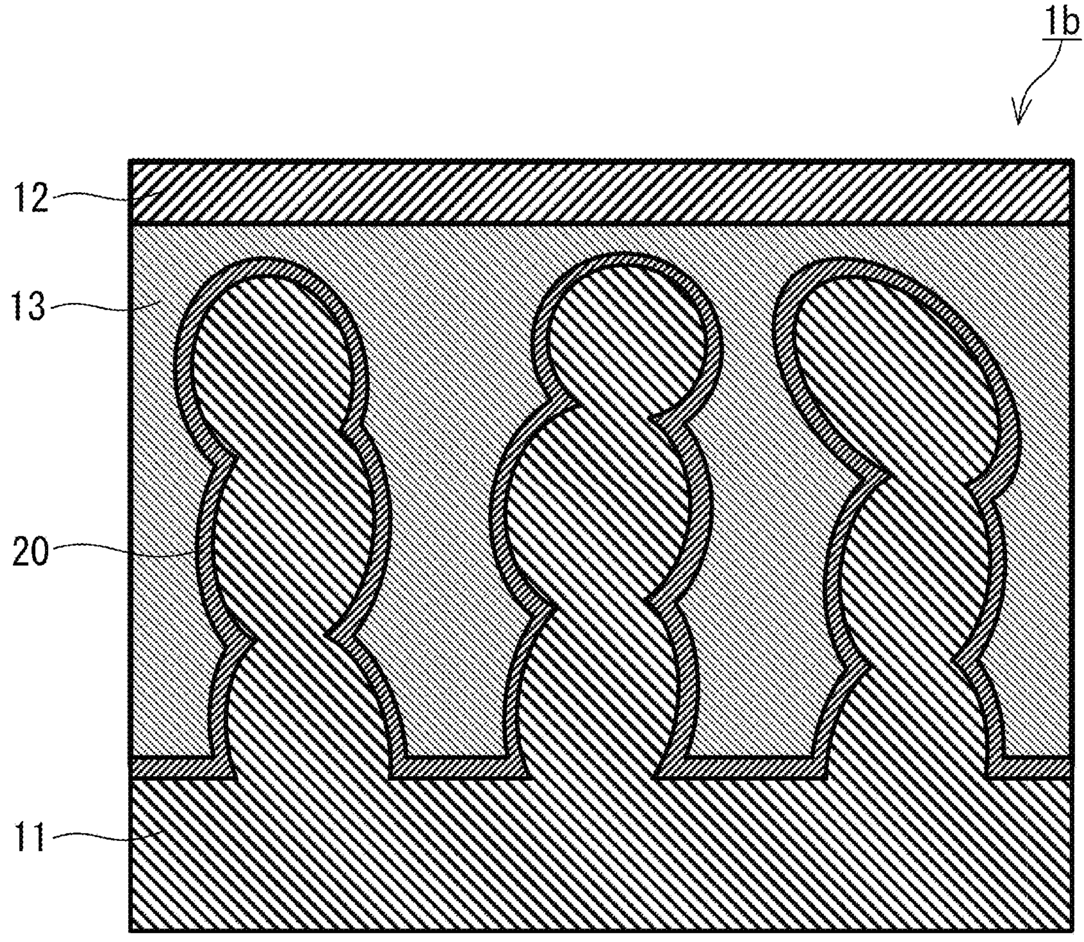
FIG. 3 is a cross-sectional view showing another example of a capacitor of the present disclosure.

FIG. 3 is a cross-sectional view of another example of a capacitor of the present disclosure. A capacitor 1*b* shown in FIG. 3 is configured in the same manner as the capacitor 1*a*, except for the portions to be described in particular. Some components of the capacitor 1*b*, which are identical or correspond to the components of the capacitor 1*a*, are marked with the same sign and detailed explanations thereof are omitted. The explanation for the capacitor 1*a* also applies to the capacitor 1*b*, unless technically inconsistent.

As shown in FIG. 3, in the capacitor 1*b*, at least a part of the first electrode 11 is porous. With this structure, the surface area of the first electrode 11 is likely to be larger and the capacitance of the capacitor 1*b* is likely to be higher. Such a porous structure can be formed, for example, by etching the metal foil or sintering a powder.

As shown in FIG. 3, for example, a film of the dielectric 20 is formed on a surface of the porous site of the first electrode 11. In this case, a chemical vapor deposition method such as atomic layer deposition (ALD), CVD or mist CVD can be employed as the method for forming a film of the dielectric 20.

The first electrode 11 includes a valve metal such as Al, Ta, Nb, Zr, Hf, or Bi, for example. The second electrode 12 may include, for example, a solidified material of a silver-containing paste, a carbon material such as graphite, or both the solidified material and the carbon material.

The capacitors 1*a* and 1*b* may be electrolytic capacitors. In this case, for example, an electrolyte 13 is disposed between the first electrode 11 and the second electrode 12. The electrolyte 13 may be disposed between the dielectric 20 and the second electrode 12. In the capacitor 1*b*, the electrolyte 13 is disposed, for example, to fill voids around the porous site of the first electrode 11.

The electrolyte includes, for example, at least one selected from the group consisting of manganese oxide, an electrolyte solution, and an electrically conductive polymer. Examples of the electrically conductive polymer include polypyrrole, polythiophene, polyaniline, and derivatives thereof. The electrolyte may be a manganese compound such as manganese oxide. The electrolyte may include a solid electrolyte.

EXAMPLES

The present disclosure will be described in more detail below with reference to Examples, though the present disclosure is not limited to the following Examples.

Example 1

A Pt (111) film having a thickness of 100 nm was epitaxially grown on a c-plane sapphire single crystal substrate by RF magnetron sputtering, so that a Pt electrode was obtained. Next, a Hf-containing layer having a thickness of 20 nm was formed on the Pt electrode by RF magnetron sputtering. In the Hf-containing layer, the ratio of the number of Si atoms to the number of Hf, Si, and Ga atoms (total number) was 0.053. In the Hf-containing layer, the ratio of the number of Ga atoms to the number of Hf, Si, and Ga atoms (total number) was 0.056. Next, the sapphire single-crystal substrate with the Hf-containing layer formed thereon was heated in a nitrogen atmosphere at 700° C. for 30 seconds to perform RTA. It is understood that, in this manner, the structure of the Hf-containing layer changed from an amorphous structure so as to have a tetragonal phase exhibiting antiferroelectricity or an orthorhombic phase exhibiting ferroelectricity. Later, an Au film having a thickness of 100 nm was formed on the Hf-containing layer by vacuum deposition to obtain an Au electrode. The capacitor according to Example 1 was produced in this manner.

Figure 4:
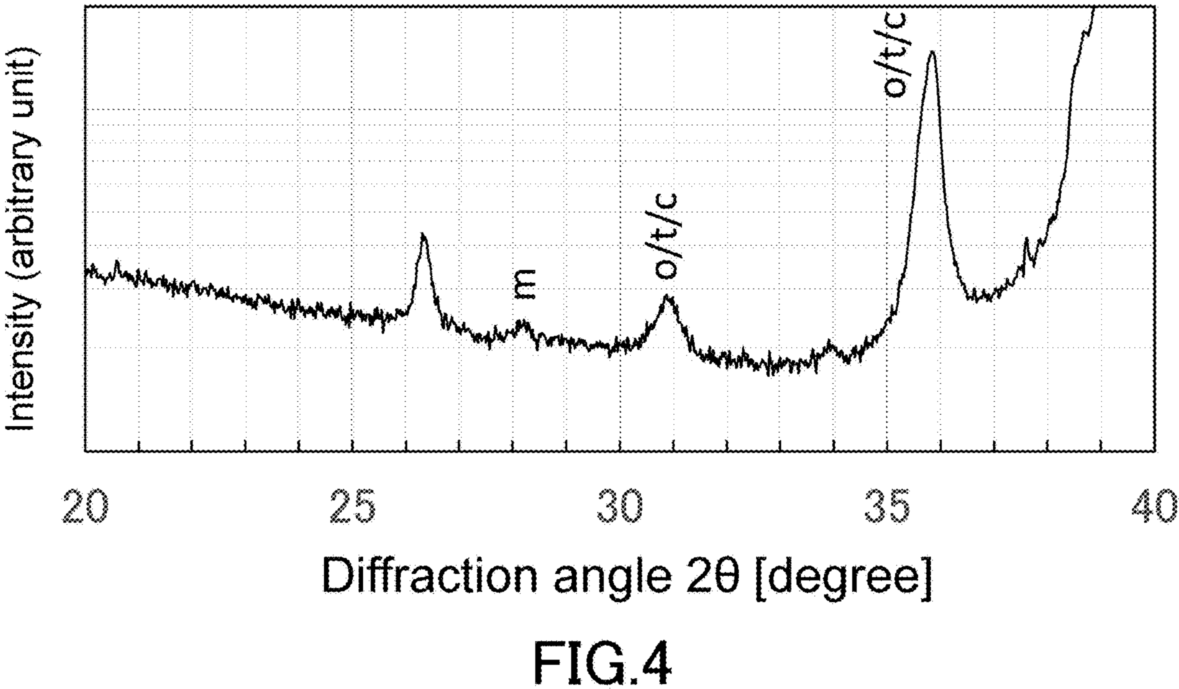
FIG. 4 is a graph showing an X-ray diffraction (XRD) profile of a dielectric of a capacitor according to Example 1.

The crystal structure of the Hf-containing layer of the capacitor according to Example 1 was evaluated using an X-ray diffraction (XRD) system Aeris manufactured by Malvern Panalytical Ltd. In the XRD, Cu-Kα rays (wavelength $\lambda$=0.15418 nm) were used as X-rays. FIG. 4 shows the XRD profile of the Hf-containing layer of the capacitor according to Example 1. In FIG. 4, the vertical axis indicates an intensity of XRD and the horizontal axis indicates a diffraction angle. In FIG. 4, a peak indicated by a sign "m" is derived from a monoclinic crystal, and a peak indicated by a sign "o/t/c" is derived from at least one selected from the group consisting of an orthorhombic crystal, a tetragonal crystal, and a cubic crystal. With reference to FIG. 4, it is understood that the Hf-containing layer of the capacitor according to Example 1 includes a small amount of monoclinic crystal, but the main phase is a fluorite structure of at least one selected from the group consisting of a tetragonal crystal, an orthorhombic crystal, and a cubic crystal.

The composition of the Hf-containing layer of the capacitor according to Example 1 was determined using a wavelength dispersive X-ray fluorescence (WDXRF) spectrometer ZSX-Primus manufactured by Rigaku Corporation. Table 1 shows an element A, an element B, the value of x, and the value of y in the case where this composition is represented by $Hf_{1-x-y}A_xB_yO_2$.

Figure 5:
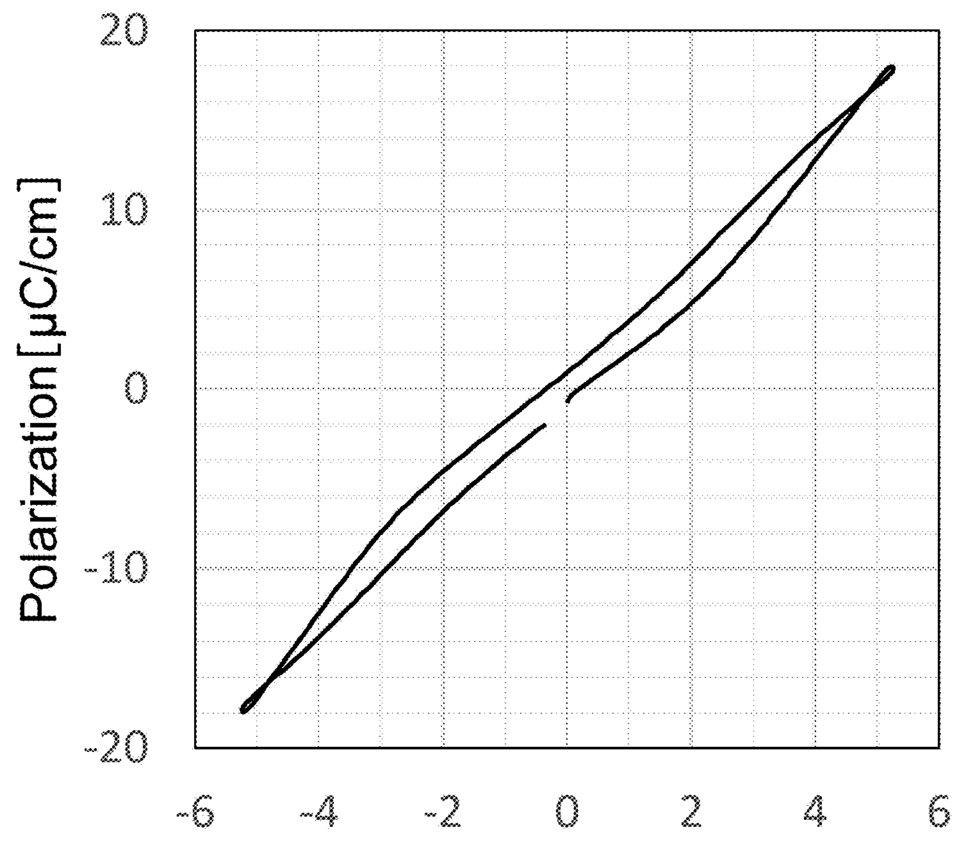
FIG. 5 is a graph showing a relation between polarization and an electric field strength in the dielectric of the capacitor according to Example 1.

A Polarization-Electric field measurement was performed on the capacitor according to Example 1, using a ferroelectric tester Premier II manufactured by Radiant Technologies Inc., whereby a P-E curve of the capacitor according to Example 1 was obtained. Based on this P-E curve, the dielectric properties of the capacitor according to Example 1 were evaluated. FIG. 5 shows the P-E curve of the capacitor according to Example 1, showing the relation between polarization and an electric field strength in the Hf-containing layer. In FIG. 5, the vertical axis indicates the polarization and the horizontal axis indicates the electric field strength. In the P-E curve, an area SPE [$\mu C \cdot MV/cm^3$] being enclosed by the P-E curve, a first straight line, and a second straight line, was determined. The first straight line is a straight line satisfying a requirement that the electric field strength is 0 [$MV/cm^2$] or more and the polarization is 0 [$\mu C/cm^2$]. The second straight line is a straight line satisfying a requirement that the electric field strength is 0 [$MV/cm^2$] and the polarization is 0 [$\mu C/cm^2$] or more. As shown in FIG. 5, no significant hysteresis loss occurred in the capacitor according to Example 1 during a boost (charging) and a buck (discharging), suggesting that energy loss can be decreased. With regard to the hysteresis loss of the capacitor, a case of the area $S_{PE}$ being 15 [$J/cm^3$] or less was evaluated as "A", and other cases were evaluated as "X". The results are shown in Table 1.

Figure 6:
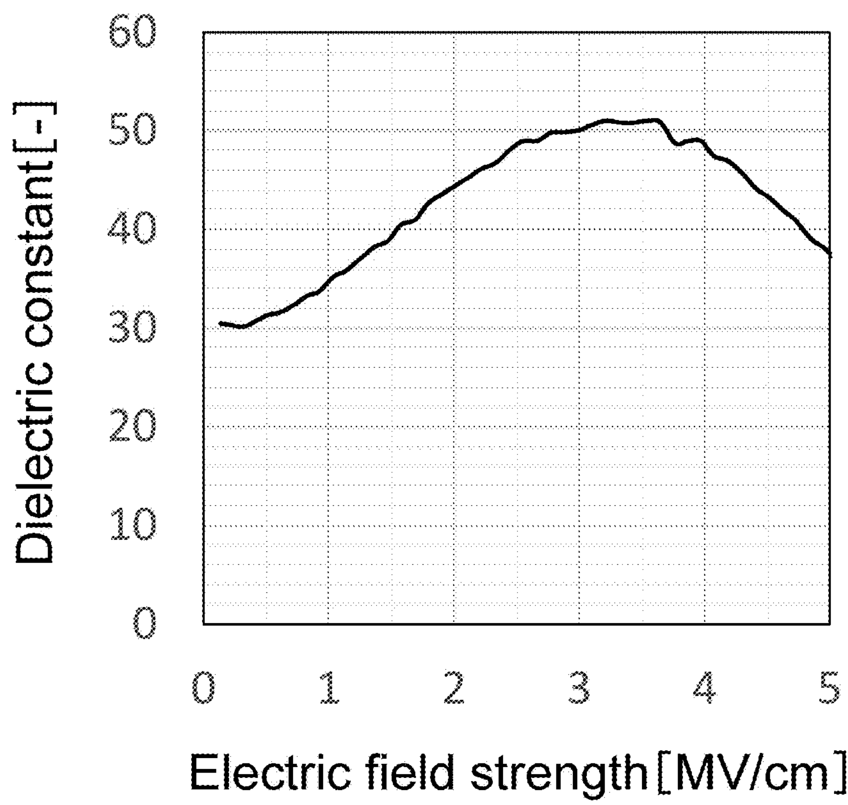
FIG. 6 is a graph showing a relation between a dielectric constant and the electric field strength in the dielectric of the capacitor according to Example 1.

In the P-E curve obtained by increasing the electric field strength, the dielectric constant of the Hf-containing layer of the capacitor according to Example 1 was determined by calculating the derivative of the polarization with the electric field strength as a variable. FIG. 6 shows a relation between a dielectric constant of the Hf-containing layer and an electric field strength of the capacitor according to Example 1. As shown in FIG. 6, the dielectric constant of the Hf-containing layer at an electric field strength of 0 MV/cm (no voltage applied) was approximately 30, while the dielectric constant of the Hf-containing layer at an electric field strength of 3.0 MV/cm to 3.5 MV/cm increased to approximately 50. That is, the polarization and the electric field strength had a nonlinear relation in the capacitor of Example 1. With regard to the nonlinearity of the relation between the polarization and the electric field strength in the capacitor, the capacitor was evaluated as having nonlinearity in the case where the ratio of the maximum value to the minimum value of the dielectric constant at each electric field strength was 1.5 or more, and was evaluated as having no nonlinearity in other cases. The results are shown in Table 1.

Example 2

In the Hf-containing layer, the ratio of the number of Si atoms to the number of Hf, Si, and Ga atoms (total number) was 0.078. In the Hf-containing layer, the ratio of the number of Ga atoms to the number of Hf, Si, and Ga atoms (total number) was 0.061. A capacitor according to Example 2 was produced in the same manner as in Example 1, except that the RF magnetron sputtering conditions for forming the Hf-containing layer were adjusted in this manner. Regarding the capacitor according to Example 2, the crystal structure of the Hf-containing layer, the composition of the Hf-containing layer, and the dielectric properties were evaluated as in Example 1. The results are shown in Table 1.

Example 3

In the Hf-containing layer, the ratio of the number of Si atoms to the number of Hf, Si, and Ga atoms (total number) was 0.035. In the Hf-containing layer, the ratio of the number of Ga atoms to the number of Hf, Si, and Ga atoms (total number) was 0.061. A capacitor according to Example 3 was produced in the same manner as in Example 1, except that the RF magnetron sputtering conditions for forming the Hf-containing layer were adjusted in this manner. Regarding the capacitor according to Example 3, the crystal structure of the Hf-containing layer, the composition of the Hf-containing layer, and the dielectric properties were evaluated as in Example 1. The results are shown in Table 1.

Example 4

In the Hf-containing layer, the ratio of the number of Si atoms to the number of Hf, Si, and Ga atoms (total number) was 0.035. In the Hf-containing layer, the ratio of the number of Ga atoms to the number of Hf, Si, and Ga atoms (total number) was 0.102. A capacitor according to Example 4 was produced in the same manner as in Example 1, except that the RF magnetron sputtering conditions for forming the Hf-containing layer were adjusted in this manner. Regarding the capacitor according to Example 4, the crystal structure of the Hf-containing layer, the composition of the Hf-containing layer, and the dielectric properties were evaluated as in Example 1. The results are shown in Table 1.

Example 5

In the Hf-containing layer, the ratio of the number of Si atoms to the number of Hf, Si, and Ga atoms (total number) was 0.014. In the Hf-containing layer, the ratio of the number of Ga atoms to the number of Hf, Si, and Ga atoms (total number) was 0.102. A capacitor according to Example 5 was produced in the same manner as in Example 1, except that the RF magnetron sputtering conditions for forming the Hf-containing layer were adjusted in this manner. Regarding the capacitor according to Example 5, the crystal structure of the Hf-containing layer, the composition of the Hf-containing layer, and the dielectric properties were evaluated as in Example 1. The results are shown in Table 1.

Comparative Example 1

Figure 7:
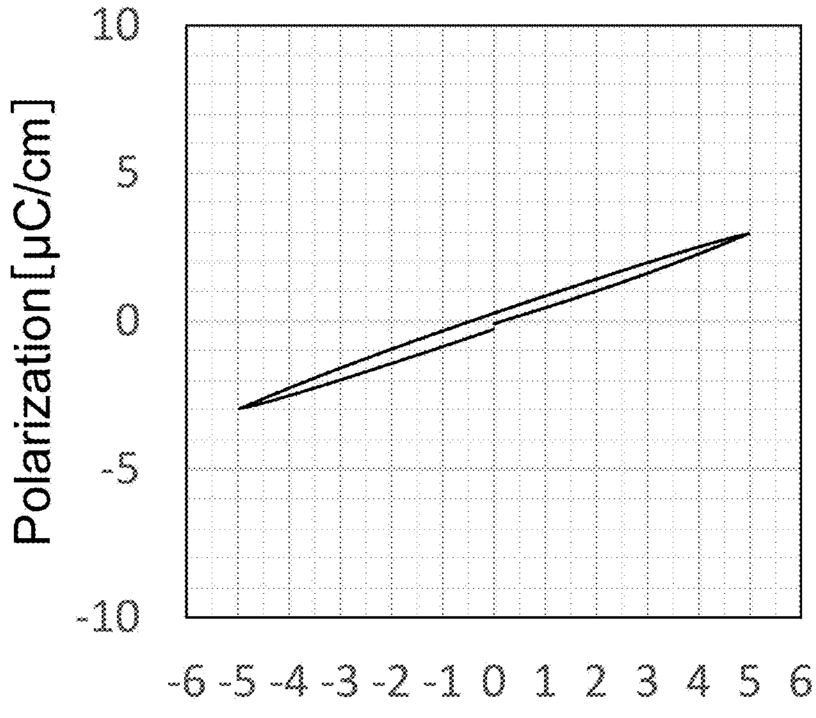
FIG. 7 is a graph showing a relation between polarization and an electric field strength in a dielectric of a capacitor according to Comparative Example 1.
Figure 8:
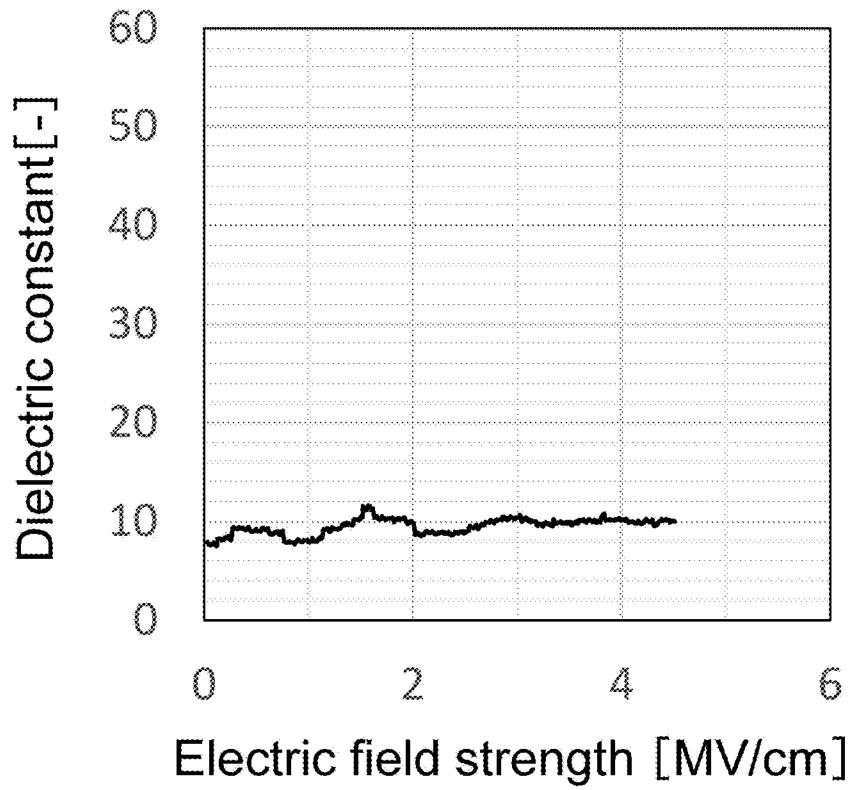
FIG. 8 is a graph showing a relation between a dielectric constant and the electric field strength in the dielectric of the capacitor according to Comparative Example 1.

A capacitor according to Comparative Example 1 was produced in the same manner as in Example 1, except that the RF magnetron sputtering conditions for forming the Hf-containing layer were adjusted to have a composition of $HfO_2$ free of Si and Ga. The composition of the Hf-containing layer and dielectric properties of the capacitor according to Comparative Example 1 were evaluated in the same manner as in Example 1. The results are shown in Table 1. FIG. 7 is a graph (P-E curve) showing a relation between polarization and an electric field strength in a dielectric of the capacitor according to Comparative Example 1. In FIG. 7, the vertical axis indicates polarization and the horizontal axis indicates an electric field strength. FIG. 8 shows a relation between a dielectric constant of the Hf-containing layer and the electric field strength of the capacitor for Comparative Example 1. In FIG. 8, the vertical axis indicates the dielectric constant and the horizontal axis indicates the electric field strength.

Comparative Example 2

Figure 9:
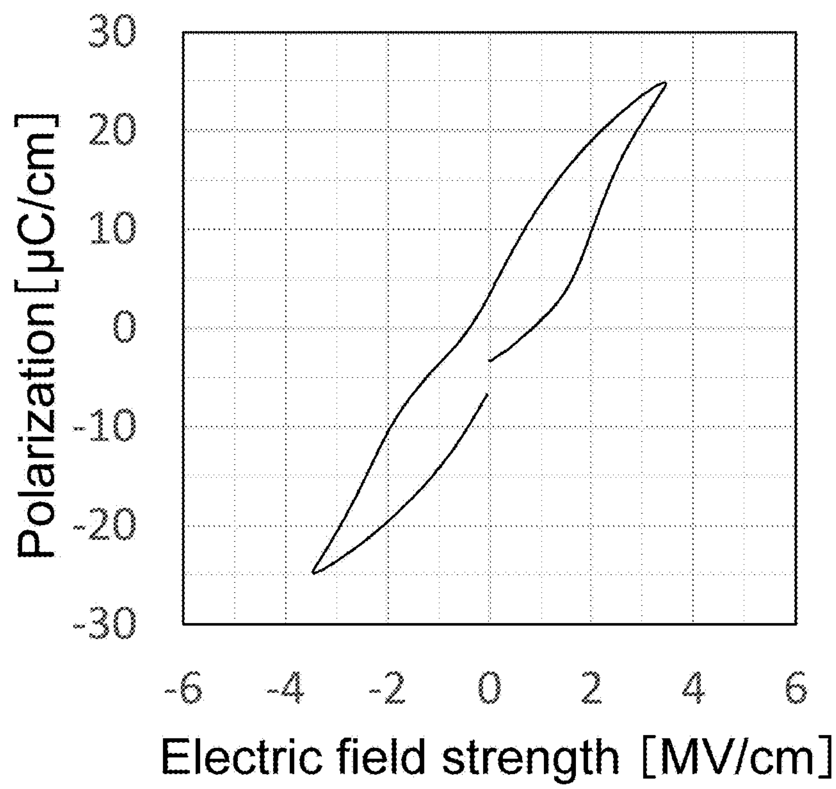
FIG. 9 is a graph showing a relation between polarization and an electric field strength in a dielectric of a capacitor according to Comparative Example 2.

In the Hf-containing layer, the ratio of the number of Si atoms to the number of Hf, Si, and Ga atoms (total number) was 0.053. In the Hf-containing layer, the ratio of the number of Ga atoms to the number of Hf, Si, and Ga atoms (total number) was 0. A capacitor according to Comparative Example 2 was produced in the same manner as in Example 1, except that the RF magnetron sputtering conditions for forming the Hf-containing layer were adjusted in this manner. Regarding the capacitor according to Comparative Example 2, the composition of the Hf-containing layer and the dielectric properties were evaluated in the same manner as in Example 1. The results are shown in Table 1. FIG. 9 shows a relation between polarization of the Hf-containing layer and an electric field strength of the capacitor according to Comparative Example 2. In FIG. 9, the vertical axis indicates the polarization and the horizontal axis indicates the electric field strength.

Comparative Example 3

In the Hf-containing layer, the ratio of the number of Si atoms to the number of Hf, Si, and Ga atoms (total number) was 0. In the Hf-containing layer, the ratio of the number of Ga atoms to the number of Hf, Si, and Ga atoms (total number) was 0.077. A capacitor according to Comparative Example 3 was produced in the same manner as in Example 1, except that the RF magnetron sputtering conditions for forming the Hf-containing layer were adjusted in this manner. Regarding the capacitor according to Comparative Example 3, the composition of the Hf-containing layer and the dielectric properties were evaluated in the same manner as in Example 1. The results are shown in Table 1.

Comparative Example 4

In the Hf-containing layer, the ratio of the number of Si atoms to the number of Hf, Si, and Ga atoms (total number) was 0. In the Hf-containing layer, the ratio of the number of Ga atoms to the number of Hf, Si, and Ga atoms (total number) was 0.153. A capacitor according to Comparative Example 4 was produced in the same manner as in Example 1, except that the RF magnetron sputtering conditions for forming the Hf-containing layer were adjusted in this manner. Regarding the capacitor according to Comparative Example 4, the composition of the Hf-containing layer and the dielectric properties were evaluated in the same manner as in Example 1. The results are shown in Table 1.

Comparative Example 5

In the Hf-containing layer, the ratio of the number of Si atoms to the number of Hf, Si, and Ga atoms (total number) was 0.078. In the Hf-containing layer, the ratio of the number of Ga atoms to the number of Hf, Si, and Ga atoms (total number) was 0.026. A capacitor according to Comparative Example 5 was produced in the same manner as in Example 1, except that the RF magnetron sputtering conditions for forming the Hf-containing layer were adjusted in this manner. Regarding the capacitor according to Comparative Example 5, the composition of the Hf-containing layer and the dielectric properties were evaluated in the same manner as in Example 1. The results are shown in Table 1.

Comparative Example 6

In the Hf-containing layer, the ratio of the number of Si atoms to the number of Hf, Si, and Ga atoms (total number) was 0.113. In the Hf-containing layer, the ratio of the number of Ga atoms to the number of Hf, Si, and Ga atoms (total number) was 0.061. A capacitor according to Comparative Example 6 was produced in the same manner as in Example 1, except that the RF magnetron sputtering conditions for forming the Hf-containing layer were adjusted in this manner. Regarding the capacitor according to Comparative Example 6, the composition of the Hf-containing layer and the dielectric properties were evaluated in the same manner as in Example 1. The results are shown in Table 1.

Comparative Example 7

In the Hf-containing layer, the ratio of the number of Si atoms to the number of Hf, Si, and Ga atoms (total number) was 0.106. In the Hf-containing layer, the ratio of the number of Ga atoms to the number of Hf, Si, and Ga atoms (total number) was 0. A capacitor according to Comparative Example 7 was produced in the same manner as in Example 1, except that the RF magnetron sputtering conditions for forming the Hf-containing layer were adjusted in this manner. Regarding the capacitor according to Comparative Example 7, the composition of the Hf-containing layer and the dielectric properties were evaluated in the same manner as in Example 1. The results are shown in Table 1.

Comparative Example 8

In the Hf-containing layer, the ratio of the number of Si atoms to the number of Hf, Si, and Ga atoms (total number) was 0.078. In the Hf-containing layer, the ratio of the number of Ga atoms to the number of Hf, Si, and Ga atoms (total number) was 0.102. A capacitor according to Comparative Example 8 was produced in the same manner as in Example 1, except that the RF magnetron sputtering conditions for forming the Hf-containing layer were adjusted in this manner. Regarding the capacitor according to Comparative Example 8, the composition of the Hf-containing layer and the dielectric properties were evaluated in the same manner as in Example 1. The results are shown in Table 1.

Comparative Example 9

In the Hf-containing layer, the ratio of the number of Si atoms to the number of Hf, Si, and Ga atoms (total number) was 0.035. In the Hf-containing layer, the ratio of the number of Ga atoms to the number of Hf, Si, and Ga atoms (total number) was 0.153. A capacitor according to Comparative Example 9 was produced in the same manner as in Example 1, except that the RF magnetron sputtering conditions for forming the Hf-containing layer were adjusted in this manner. Regarding the capacitor according to Comparative Example 9, the composition of the Hf-containing layer and the dielectric properties were evaluated in the same manner as in Example 1. The results are shown in Table 1.

Comparative Example 10

In the Hf-containing layer, the ratio of the number of Ti atoms to the number of Hf, Ti, and Nb atoms (total number) was 0.016. In the Hf-containing layer, the ratio of the number of Nb atoms to the number of Hf, Ti, and Nb atoms (total number) was 0.005. A capacitor according to Comparative Example 10 was prepared in the same manner as in Example 1, except that the RF magnetron sputtering conditions for forming the Hf-containing layer were adjusted in this manner. Regarding the capacitor according to Comparative Example 10, the composition of the Hf-containing layer and the dielectric properties were evaluated as in Example 1. The results are shown in Table 1.

Comparative Example 11

In the Hf-containing layer, the ratio of the number of Sr atoms to the number of Hf, Sr, and Nb atoms (total number) was 0.005. In the Hf-containing layer, the ratio of the number of Nb atoms to the number of Hf, Sr, and Nb atoms (total number) was 0.003. A capacitor according to Comparative Example 11 was produced in the same manner as in Example 1, except that the RF magnetron sputtering conditions for forming the Hf-containing layer were adjusted in this manner. Regarding the capacitor according to Comparative Example 11, the composition of the Hf-containing layer and the dielectric properties were evaluated in the same manner as in Example 1. The results are shown in Table 1.

Comparative Example 12

In the Hf-containing layer, the ratio of the number of Gd atoms to the number of Hf, Gd, and Nb atoms (total number) was 0.059. In the Hf-containing layer, the ratio of the number of Nb atoms to the number of Hf, Gd, and Nb atoms (total number) was 0.006. A capacitor according to Comparative Example 12 was produced in the same manner as in Example 1, except that the RF magnetron sputtering conditions for forming the Hf-containing layer were adjusted in this manner. Regarding the capacitor according to Comparative Example 12, the composition of the Hf-containing layer and the dielectric properties were evaluated in the same manner as in Example 1. The results are shown in Table 1.

As shown in Table 1, nonlinear relations were observed with regard to the polarization and the electric field strength in the capacitors according to Examples 1 to 5. In addition, the hysteresis loss was small in the capacitors according to Examples 1 to 5. This suggests that the capacitors according to Examples 1 to 5 are advantageous from the viewpoint of high capacitance and highly efficient charging and discharging. On the other hand, the capacitors according to Comparative Examples 1 and 6 to 12 showed no nonlinear relation regarding the polarization and the electric field strength. For example, in the capacitor according to Comparative Example 1, the Hf-containing layer had paraelectric dielectric properties, as shown in FIGS. 7 and 8. In the capacitors according to Comparative Examples 2 to 5, a nonlinear relation was observed in the polarization and the electric field strength, but the hysteresis loss was large. For example, in the capacitor according to Comparative Example 2, as shown in FIG. 9, the Hf-containing layer had antiferroelectric dielectric properties, but the hysteresis loss was large, and it seemed as not advantageous from the viewpoint of highly efficient charging and discharging.

Figure 10:
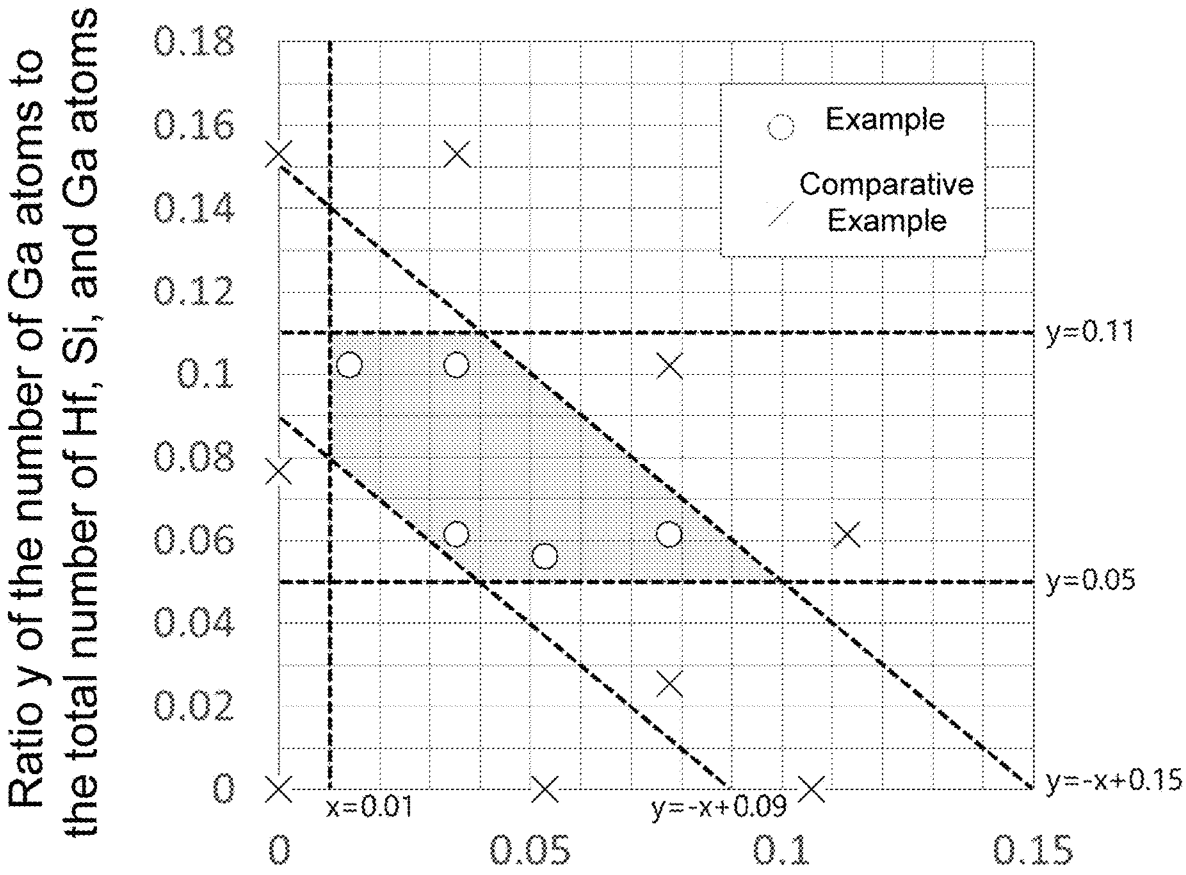
FIG. 10 is a graph showing a relation between composition ratios and dielectric properties in the dielectrics of the capacitors according to Examples 1 to 5 and Comparative Examples 1 to 9, where the composition ratios include a composition ratio of Si and a composition ratio of Ga.

FIG. 10 is a graph showing a relation between composition ratios and dielectric properties in the dielectrics of the capacitors according to Examples 1 to 5 and Comparative Examples 1 to 9, where the composition ratios include a composition ratio of Si and a composition ratio of Ga. In FIG. 10, the vertical axis indicates a ratio y of the number of atoms of Ga to the number of atoms of Hf, Si, and Ga in Hf-containing layers. The horizontal axis indicates a ratio x of the number of Si atoms to the number of Hf, Si, and Ga atoms in the Hf-containing layers. In FIG. 10, "○" plots indicate Examples and "x" plots indicate Comparative Examples. As shown in FIG. 10, in the case where the oxide with the composition of $Hf_{1-x-y}Si_xGa_yO_z$ in the dielectric of the capacitor satisfies requirements $0.01 \leq x$, $0.05 \leq y \leq 0.11$, and $0.09 \leq x+y \leq 0.15$, a high capacitance and highly efficient charging and discharging may be easily achieved.

TABLE 1

| | Composition of Hf-containing layer $Hf_{1-x-y}A_xB_yO_z$ | | | | | Dielectric properties | |
|---|---|---|---|---|---|---|---|
| | Element A | x | Element B | y | Crystal structure | Nonlinearity | Hysteresis loss |
| Example 1 | Si | 0.053 | Ga | 0.056 | Fluorite structure | Yes | A |
| Example 2 | Si | 0.078 | Ga | 0.061 | Fluorite structure | Yes | A |
| Example 3 | Si | 0.035 | Ga | 0.061 | Fluorite structure | Yes | A |
| Example 4 | Si | 0.035 | Ga | 0.102 | Fluorite structure | Yes | A |
| Example 5 | Si | 0.014 | Ga | 0.102 | Fluorite structure | Yes | A |
| Comparative Example 1 | — | — | — | — | — | No | -(Paraelectric) |
| Comparative Example 2 | Si | 0.053 | Ga | 0 | — | Yes | X |
| Comparative Example 3 | Si | 0 | Ga | 0.077 | — | Yes | X |
| Comparative Example 4 | Si | 0 | Ga | 0.153 | — | Yes | X |
| Comparative Example 5 | Si | 0.078 | Ga | 0.026 | — | Yes | X |
| Comparative Example 6 | Si | 0.113 | Ga | 0.061 | — | No | -(Paraelectric) |
| Comparative Example 7 | Si | 0.106 | Ga | 0 | — | No | -(Paraelectric) |
| Comparative Example 8 | Si | 0.078 | Ga | 0.102 | — | No | -(Paraelectric) |
| Comparative Example 9 | Si | 0.035 | Ga | 0.153 | — | No | -(Paraelectric) |
| Comparative Example 10 | Ti | 0.016 | Nb | 0.005 | — | No | -(Paraelectric) |
| Comparative Example 11 | Sr | 0.005 | Nb | 0.003 | — | No | -(Paraelectric) |
| Comparative Example 12 | Gd | 0.059 | Nb | 0.006 | — | No | -(Paraelectric) |

INDUSTRIAL APPLICABILITY

The capacitors of the present disclosure are advantageous from the viewpoint of high capacitance and highly efficient charging and discharging.

What is claimed is:

1. A capacitor comprising:

a first electrode;

a second electrode; and a dielectric disposed between the first electrode and the second electrode, wherein the dielectric includes an oxide having a composition represented by $Hf_{1-x-y}Si_xGa_yO_z$, in the composition, the z is a value to maintain electroneutrality of the oxide, and the composition satisfies requirements $0.01 \leq x$, $0.05 \leq y \leq 0.11$, and $0.09 \leq x+y \leq 0.15$.

2. The capacitor according to claim 1, wherein the oxide includes a fluorite structure.

3. The capacitor according to claim 2, wherein the oxide includes at least one selected from the group consisting of a tetragonal phase and an orthorhombic phase.

4. An electric circuit comprising the capacitor according to claim 1.

5. A circuit board comprising the capacitor according to claim 1.

6. An apparatus comprising the capacitor according to claim 1.

7. A power storage device comprising the capacitor according to claim 1.

* * * * *